United States Patent [19]
Theroux et al.

[11] Patent Number: 5,717,807
[45] Date of Patent: Feb. 10, 1998

[54] LIQUID LIGHT GUIDE WITH IMPROVED SEALING CHARACTERISTICS

[75] Inventors: Marc J. Theroux, Bethel; Andrew M. Candelora, East Haven, both of Conn.; Andrew J. McCarthy, Norton, Mass.

[73] Assignee: United States Surgical Corporation, Norwalk, Conn.

[21] Appl. No.: 502,749

[22] Filed: Jul. 14, 1995

[51] Int. Cl.$^6$ .............................. G02B 6/02; G02B 6/20
[52] U.S. Cl. .............................. 385/125; 362/32; 606/15
[58] Field of Search .................... 606/2–19; 385/31–32, 385/125–142; 362/32, 268, 277, 318, 804; 600/178, 182, 140

[56] References Cited

U.S. PATENT DOCUMENTS

| | | | |
|---|---|---|---|
| 3,089,484 | 5/1963 | Hett | 385/125 |
| 3,641,332 | 2/1972 | Reick et al. | 362/32 |
| 3,740,113 | 6/1973 | Cass | 362/32 |
| 3,770,350 | 11/1973 | Stone et al. | 356/75 |
| 3,814,497 | 6/1974 | Stone | 385/125 |
| 3,920,980 | 11/1975 | Nath | 385/125 |
| 3,995,934 | 12/1976 | Nath | 385/125 |
| 4,009,382 | 2/1977 | Nath | 385/125 |
| 4,045,119 | 8/1977 | Eastgate | 385/125 |
| 4,286,839 | 9/1981 | Ilzig et al. | 385/125 X |
| 4,465,621 | 8/1984 | Sacher | 252/382 |
| 4,471,474 | 9/1984 | Fields | 367/149 |
| 4,491,533 | 1/1985 | Sacher et al. | 252/301 |
| 4,526,711 | 7/1985 | Sacher et al. | 252/582 |
| 4,747,662 | 5/1988 | Fitz | 385/125 |
| 4,801,187 | 1/1989 | Elbert et al. | 385/125 |
| 4,805,598 | 2/1989 | Ueda | 128/6 |
| 4,901,922 | 2/1990 | Kessener et al. | 362/32 |
| 4,907,133 | 3/1990 | Nath | 362/32 |
| 4,927,231 | 5/1990 | Levatter | 362/32 |
| 4,957,347 | 9/1990 | Zarlon | 264/1.5 X |
| 5,052,778 | 10/1991 | Jamshid | 385/125 |
| 5,067,784 | 11/1991 | Debortli et al. | 385/33 |

(List continued on next page.)

FOREIGN PATENT DOCUMENTS

| | | |
|---|---|---|
| 48867 | 5/1974 | Australia . |
| 0105706 | 8/1987 | European Pat. Off. . |
| 2689649 | 10/1993 | France . |
| 2352670 | 10/1973 | Germany . |
| 2406424 | 2/1974 | Germany . |
| 2424620 | 5/1974 | Germany . |
| 2429859 | 6/1974 | Germany . |
| 2433218 | 7/1974 | Germany . |
| 2719504 | 5/1977 | Germany . |
| 3523243 | 6/1985 | Germany . |
| 3529488 | 8/1985 | Germany . |
| 3626629 | 8/1986 | Germany . |
| 3634651 | 10/1986 | Germany . |
| 3644839 | 12/1986 | Germany . |
| 3704871 | 2/1987 | Germany . |
| 3704872 | 2/1987 | Germany . |
| 3812473 | 4/1988 | Germany . |
| 613284 | 4/1977 | Sweden . |
| 1450608 | 9/1976 | United Kingdom . |
| 1502445 | 3/1978 | United Kingdom . |
| 2248312 | 4/1992 | United Kingdom . |

OTHER PUBLICATIONS

Liquid Optical Fibers, G.W. Taylor, vol. 11, No. 4, Apr. 1972 (pp. 786–790).
English Language Abstract for German Publication No. 4014363, 1990.

*Primary Examiner*—Akm E. Ullah

[57] ABSTRACT

A liquid light guide for surgical instrumentation, includes a flexible elongated tube having opposed tube portions, a transmissive member positioned within each tube end portion of the elongated tube to enclose an interior portion of the elongated tube and a light transmissive medium filling the interior portion of the elongated tube. A sealing mechanism including at least one annular groove in the light transmissive plug and at least one corresponding groove in the surrounding light source cap and endoscope adapter forms a fluid tight seal between each tube end portion and the light transmissive plug to prevent leakage of the fluid from the tube. The light guide is contemplated to be used with an endoscope and is cost-effective to manufacture. Methods of making and using the disposable light guide also are disclosed.

12 Claims, 5 Drawing Sheets

U.S. PATENT DOCUMENTS

| | | | |
|---|---|---|---|
| 5,067,831 | 11/1991 | Robbins et al. | 385/123 |
| 5,071,211 | 12/1991 | Debortoli et al. | 385/76 |
| 5,122,580 | 6/1992 | Zarion et al. | 526/64 |
| 5,138,689 | 8/1992 | Merlo et al. | 385/135 |
| 5,143,435 | 9/1992 | Kikuchi | 385/33 |
| 5,149,467 | 9/1992 | Zarion | 264/1.5 X |
| 5,165,773 | 11/1992 | Nath | 362/32 |
| 5,167,001 | 11/1992 | Debortoli et al. | 385/135 |
| 5,221,387 | 6/1993 | Robbins et al. | 156/85 |
| 5,257,329 | 10/1993 | Blyer, Jr. et al. | 385/11 |
| 5,267,341 | 11/1993 | Sherin | 385/125 |
| 5,304,171 | 4/1994 | Gregory et al. | 606/15 |
| 5,333,227 | 7/1994 | Ishiharoda et al. | 385/100 |

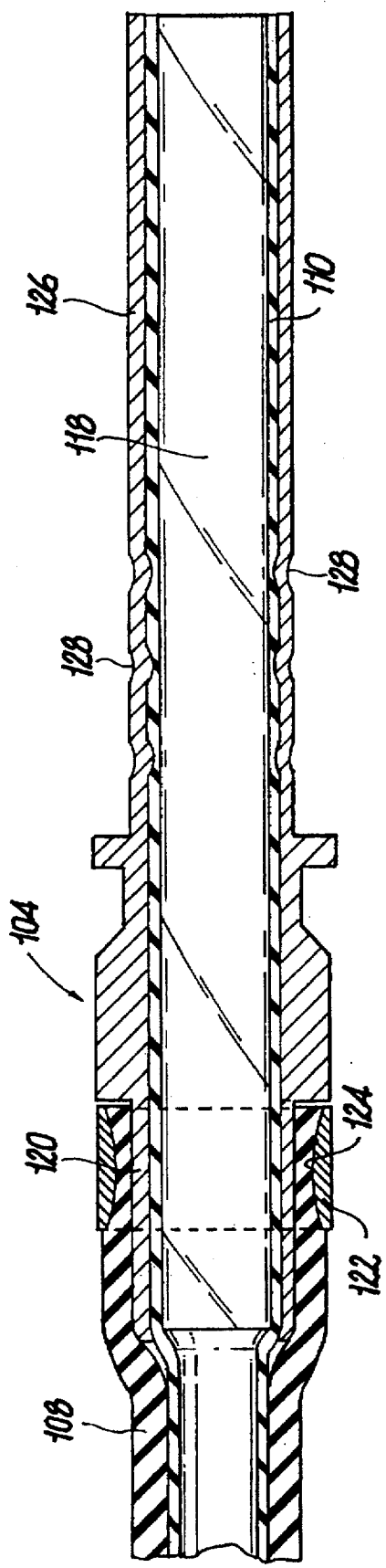
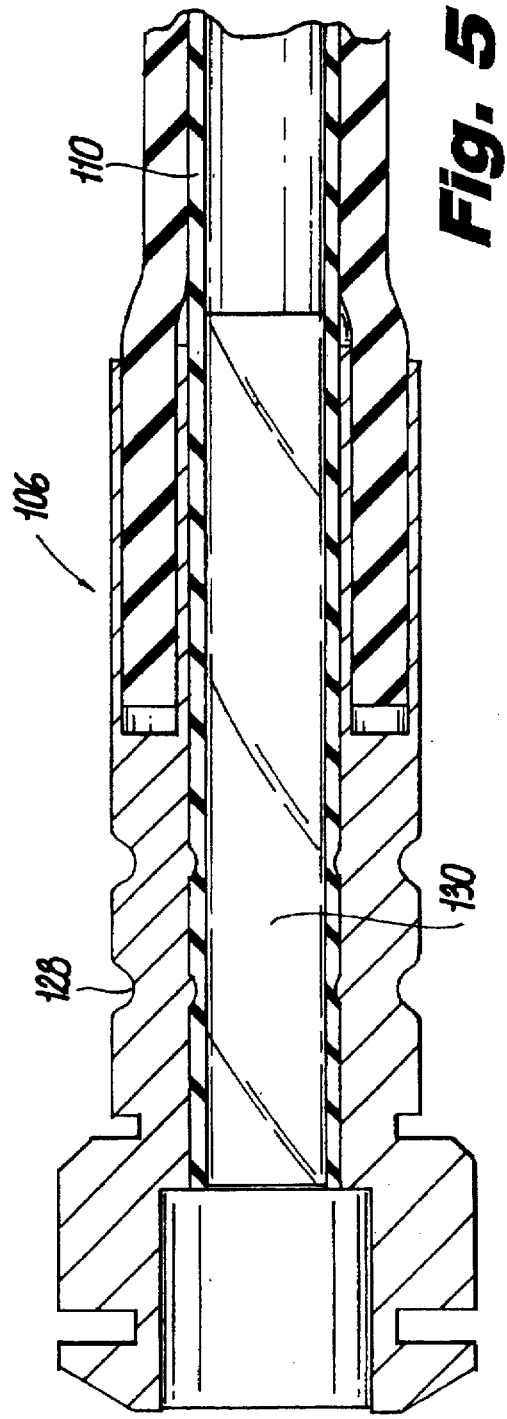

LIQUID LIGHT GUIDE WITH IMPROVED SEALING CHARACTERISTICS

BACKGROUND

1. Technical Field

The present disclosure relates generally to light guides for transferring illuminating light from a light source to surgical instrumentation, and, more particularly, to a flexible liquid light guide for transmitting light in the visible spectral range to an endoscope.

2. Background of Related Art

In endoscopic surgical procedures, illuminating light is typically transmitted from an external light source to an endoscope where the light is then transmitted via an illuminating system incorporated within the endoscope to the body cavity to be viewed. A conventional light cable for providing the endoscope with illumination is a fiber optic light bundle having a plurality of optical fibers of glass or optical plastic. The fiber optic bundle is connected at one end to the light source and at the other end to an inlet port of the endoscope. This system is typically referred to as a fiber optic light guide.

A significant drawback of fiber optic light guides involves the degradation of the fibers when used over extended periods of time. This degradation is due in part to the repetitive flexing the light guide experiences when the bundle is initially connected to the light source and the endoscope, and during maneuvering about the operative site in the course of the surgical procedure. Since fiber optic light guides are relatively expensive and are intended to be reused, the light guides are typically employed in many surgical procedures over a substantial period of time. Consequently, the light transferring quality of the fiber optic light guide tends to gradually degrade to a point where the level of light emitted by the fiber optic bundle is substantially less than the light initially received from the light source.

One attempted solution to this problem has been to substitute liquids for fiber optic bundles. Examples of such liquid light guides are described in U.S. Pat. Nos. 3,740,113; 3,920,980; 3,995,934; 4,045,119; 4,907,133 and 5,165,773. In the light guides suggested in these patents, a liquid transmissive fluid is encapsulated within a flexible tube which is closed off at each end with a transparent end plug. Light entering the guide is transmitted via the fluid to the endoscope. Conventional liquid transmissive fluids include nitrobenzene, camphor oil, linseed oil, chlorobenzene, castor oil and benzyl alcohol.

Conventional liquid light guides such as those described in the above-mentioned patents have their own drawbacks and limitations. In particular, these light guides are subject to leakage particularly through the seals created between the end plugs and the end portions of the flexible tube. This is particularly true at the light source entry side of the light guide where the heat generated by the light source affects the integrity of the seal, e.g., may degrade the adhesive seals attaching the end plug to the flexible tube. The heat may also degrade the liquid light transmissive material and introduce optical defects such as bubble therein. Another disadvantage with known liquid light guides is that they are rlatively expensive.

Accordingly, the present disclosure is directed to a low cost liquid light guide capable of efficiently supplying an endoscope with illuminating light particularly in the visible spectral range and one which incorporates structure which positively seals the end portions of the light guide cable to prevent leakage of the light transmissive fluid contained therein. Manufacture and assembly of the light guide are inexpensive.

SUMMARY

The present disclosure is directed to a liquid light guide for surgical instrumentation. The light guide includes a flexible elongated tube having opposed tube end portions, a transmissive member positioned within each tube end portion to enclose an interior portion of the elongated tube and a light transmissive fluid filling the interior portion of the elongated tube. A sealing assembly forms a fluid tight seal between each tube end portion and the light transmissive plug to prevent leakage of the liquid from the tube. The sealing assembly includes one or more annular grooves in the glass plug and corresponding crimps in the surrounding light source cap and endoscope adapter to seal the tube end portion about the transmissive plug.

The liquid light guide of the present disclosure is capable of providing efficient light transmission over the entire visible spectral range while substantially reducing undesired transmission of infrared and ultraviolet radiation. The light guide is contemplated to be used with an endoscope and is cost-effective to manufacture. Methods of making and using the disposable light guide are also disclosed.

BRIEF DESCRIPTION OF THE DRAWINGS

Preferred embodiments of the present disclosure are described hereinbelow with reference to the drawings wherein:

FIG. 4 is an enlarged cross-sectional view of the light source connector of FIG. 3 with the light transmissive end plug positioned therein;

FIG. 5 is an enlarged cross-sectional view of the endoscope connector of the light guide of FIG. 1, having a plurality of circumferential sealing grooves formed in an outer surface to form a seal between the end plug and the elongated tube;

DETAILED DESCRIPTION OF PREFERRED EMBODIMENT(S)

Figure 1:
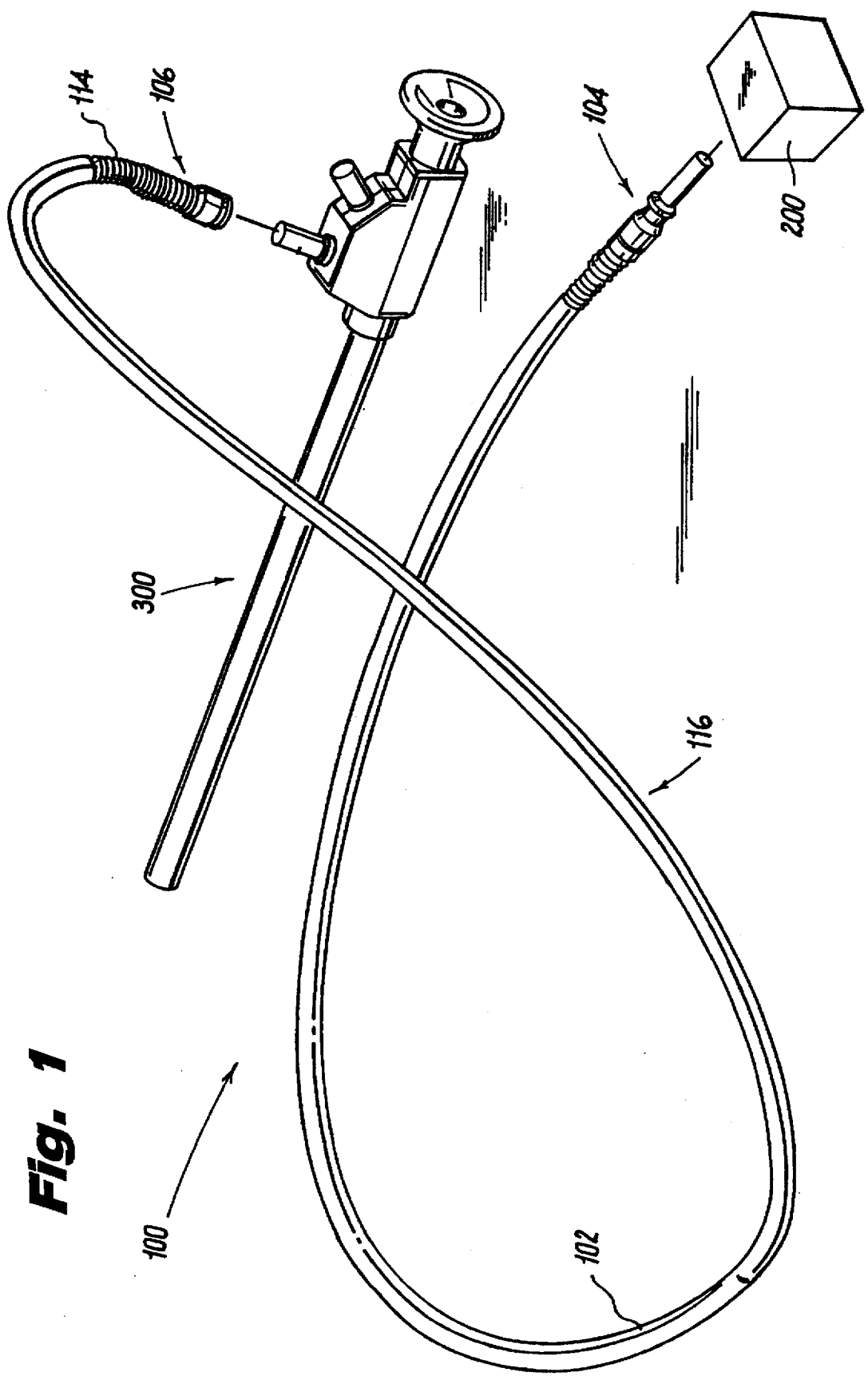
FIG. 1 is a perspective view of a light guide with a conventional endoscope and external light source.

Referring now to FIG. 1, there is illustrated an embodiment of the light guide 100. Light guide 100 is similar to the light guide disclosed in commonly assigned U.S. patent application Ser. No. 08/134,365 now U.S. Pat. No. 5,452,395, the contents of which are incorporated herein by reference. Light guide 100 includes elongated tube 102 having a light source connector 104 at one end portion and an endoscope connector 106 at the other end portion. Light source connector 104 and endoscope connector 106 are configured for connection to a conventional light source 200 and an endoscope 300, respectively.

Figure 2:
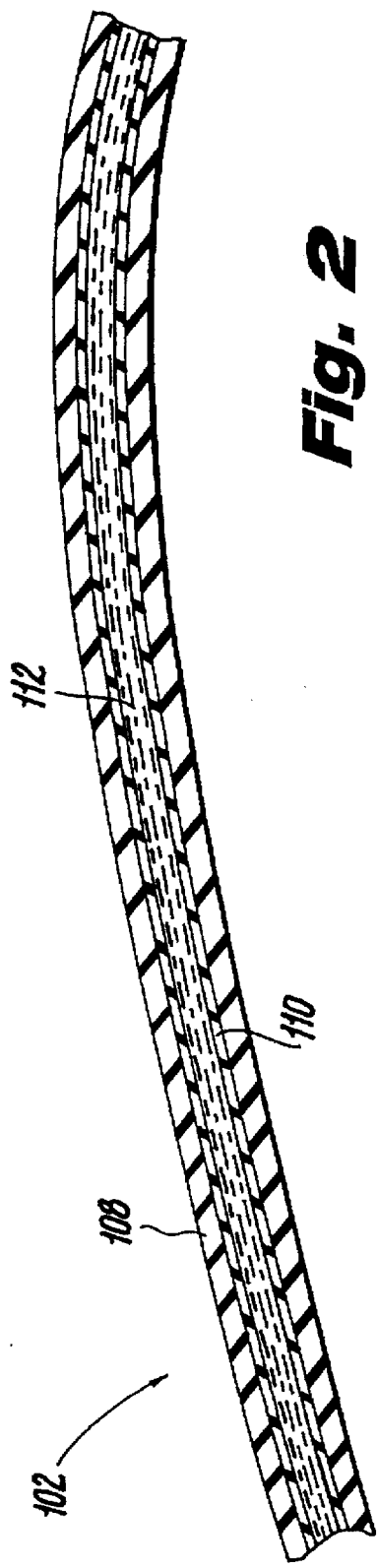
FIG. 2 is a side cross-sectional view of a portion of the flexible elongated tube of the light guide of FIG. 1 illustrating the outer tubing and inner lining.

Referring now to FIGS. 1 and 2, flexible elongated tube 102 includes an outer sheath 108 and an inner lining 110 extending along the length of the outer sheath 108. Outer sheath 108 is fabricated from a polymeric material such as polyethylene, polyvinylchloride (PVC), polytetrafluoroethylenehexafluoropropylene, perfluoralkoxy resin (PFA), a copolymer of tetrafluoroethylene and hexafluropropylene, polytetrafluoroethylene (PTFE) and the like. Inner lining 110 may be made of polytetrafluoroethylenehexafluoropropylene, perfluoralkoxy resin (PFA), a copolymer of tetrafluoroethylene and hexafluropropylene, polytetrafluoroethylene (PTFE) and the like. Inner lining 110 is preferably fabricated from fluorinated ethylene polymer (FEP).

Elongated tube 102 is filled with a light transmitting medium or fluid 112, preferably, mineral oil. A coiled spring 114 may be positioned about the periphery of elongated tube 102 to prevent kinking of the tube and provide support. A cover 116, preferably in the form of shrinkable tubing, may be positioned about spring 114.

Figure 3:
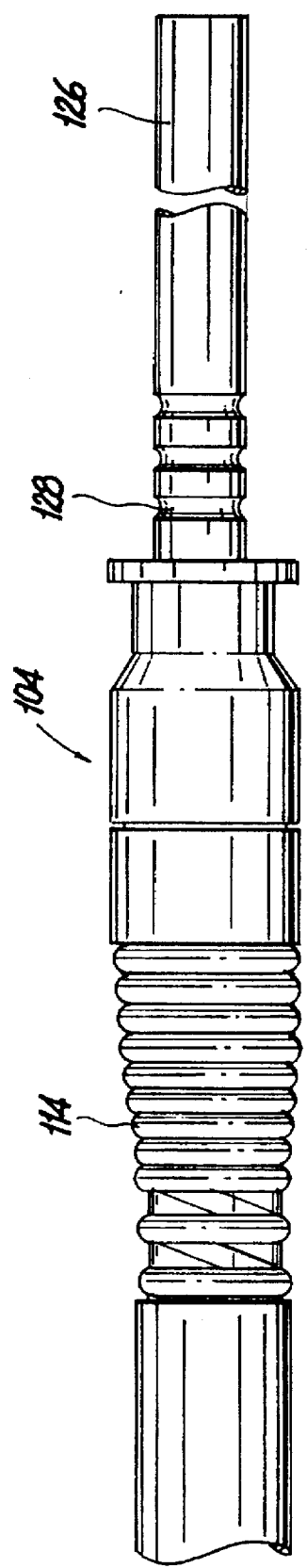
FIG. 3 is an enlarged plan view of the light source connector of the light guide of FIG. 1, illustrating a preferred method for forming a seal between the end plug and the elongated tube.

Referring now to FIGS. 3 and 4, there is illustrated the first of light entry end portion of light guide 100 in detail. Light transmissive end plug 118 is positioned in inner lining 110 and is initially retained within the inner lining by a frictional fit formed between the two components. Inner lining 110 extends the length of light source connector 104 as shown. Outer sheath 108 is positioned about the periphery of tube mounting portion 120 of light source connector 104 and a clamp 122 is slid onto the sheath 108 to securely wedge the outer sheath between the inner crowned surface 124 of the clamp 122 and the tube mounting portion 120 to attach the light source connector 104 to the tube. Once the light entry portion is assembled, a plurality of circumferential sealing grooves 128 are formed in inlet end portion 126 of connector 104 to compress the inner lining 110 against the end plug thereby creating a fluid tight seal between the end plug and the inner lining. Grooves 128 may be formed by a wheel press operation or any other crimping operations and are preferably generally arcuate in cross-section as shown. The displaced portions of inlet end portion 120 of light source connector 104 compress the inner lining 110 against end plug 118 to create pressure differentials along the end plug 118 to provide a labyrinth seal. Preferably, the grooves range from about 0.006 inches to about 0.012 inches in depth.

It is also envisioned that endoscope connector 106 may be pressed or crimped in a similar manner to effect a fluid tight seal between the inner lining and the end plug. As shown in FIG. 5, endoscope connector 106 having inner lining 110 with end plug 130 positioned therein may be pressed by a wheel press or the like to cause slight deformation of the endoscope connector, thereby forming a fluid tight seal between the inner lining 110 and the end plug 130.

Figure 6:
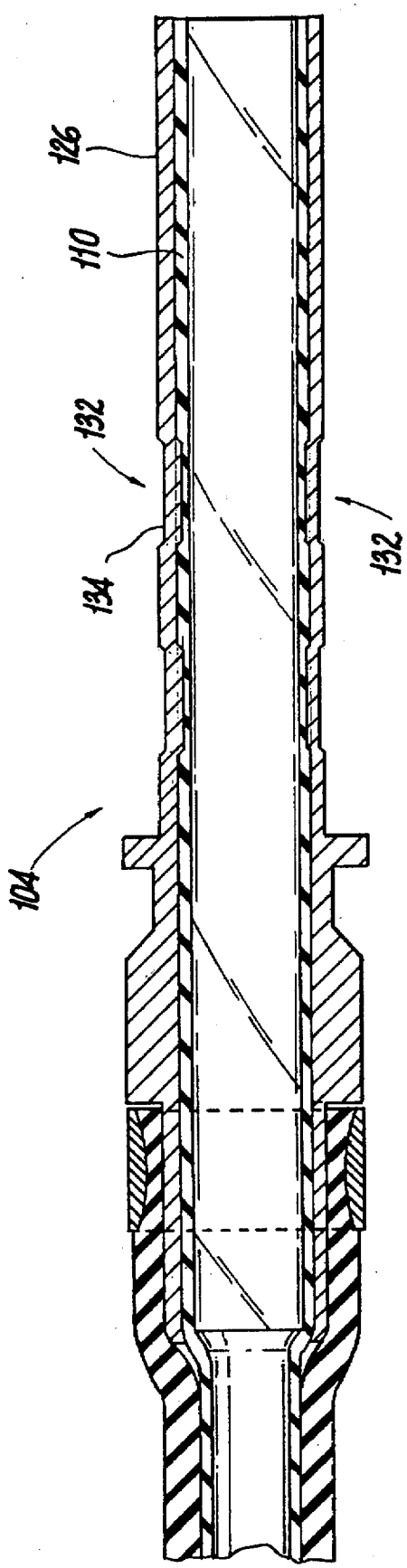
FIG. 6 is an enlarged cross-sectional view of the light source connector of FIG. 1, illustrating an alternative method for forming a seal between the end plug and the elongated tube.
Figure 7:
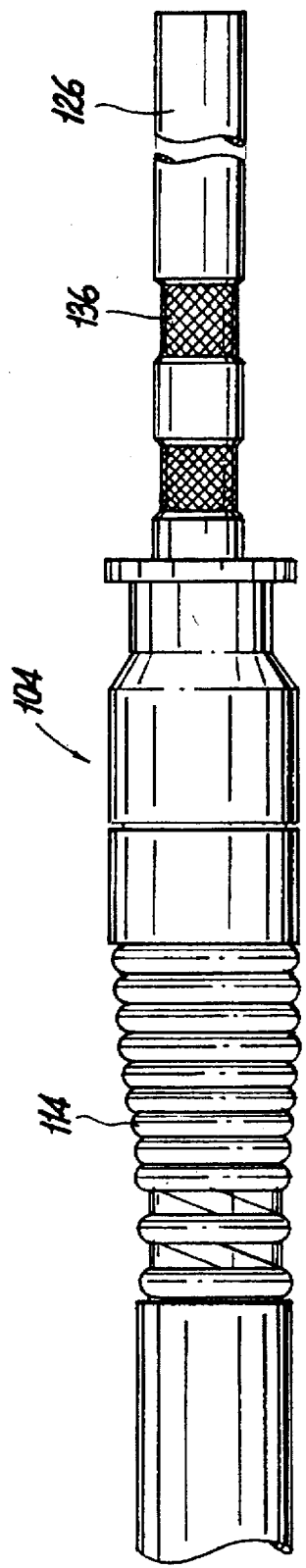
FIG. 7 is an enlarged side plan view of the light source connector of FIG. 6 in which the wide band grooves are formed as a diamond knurl pattern.

FIG. 6 illustrates an alternative method for sealing inner tubing 110 about transparent end plug 118 of light source connector 104. In accordance with this method, the grooves 132 define a generally trapezoidal cross-section having flat surfaces 134. Grooves 132 possess a greater width than that of the embodiment of FIG. 4. The preferred depth of the grooves 132 ranges from about 0.006 inches to about 0.010 inches. The increased dimension of circumferential grooves 132, which are in the form of widened bands, increases the distance over which the pressure drops. In an alternative embodiment shown in FIG. 7, the widened grooves 136 may be formed as a diamond knurl pattern to form a complex pattern of ridges and grooves.

Figure 8:
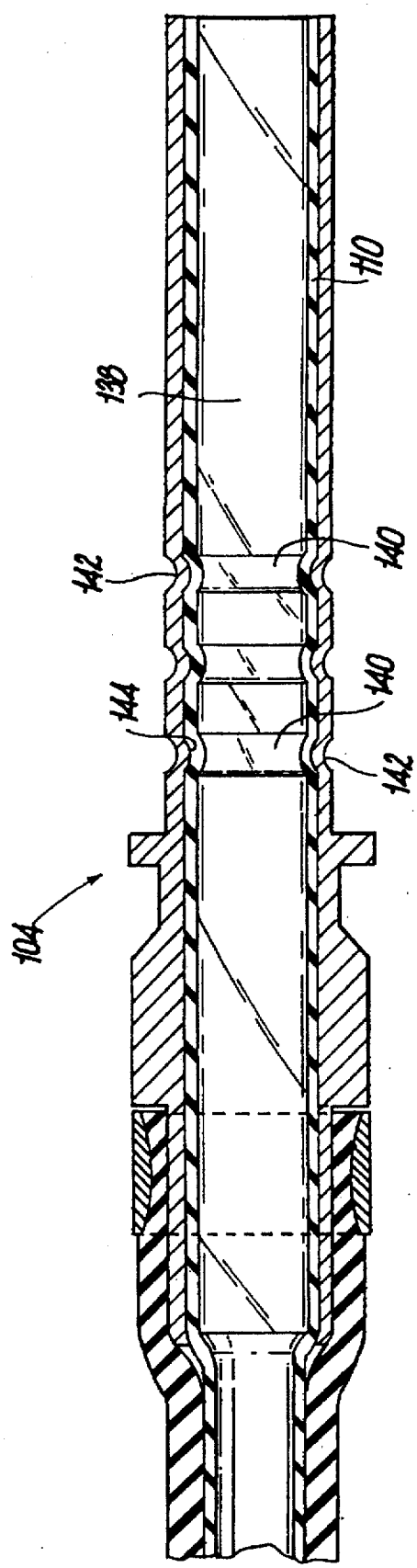
FIG. 8 is an enlarged cross-sectional view of the light source connector, illustrating an alternative method for forming a seal between the end plug and the elongated tube.

FIG. 8 illustrates another alternative method for forming a fluid tight seal within light source connector 104. In this embodiment, end plug 138 includes a plurality of circumferential grooves 140 which are formed during manufacture of the plug 138. The end plug 138 is inserted within the inner lining 110 and the assembled components are positioned with light source connector 104. Thereafter, a plurality of circumferential grooves 142 are formed in light source connector 104, preferably by a wheel press operation, in alignment with the circumferential grooves 140 of end plug 138. Consequently, inner lining 110 is compressed between the arcuate convex portions 144 of light source connector 104 and the concave portions of grooves 140 of end plug 138 thereby creating a complex path for restricting leakage of the fluid.

In an alternative embodiment, it is also possible to position end plug 138 having circumferential grooves 140 formed therein within light source connector 104. In accordance with this embodiment, light source connector 104 is not pressed to form grooves in the connector. The grooves 140 of end plug 138 are capable of creating a sufficient pressure differential to form a labyrinth seal between the end plug and the inner lining.

To the extent not already indicated, it also will be understood by those of ordinary skill in the art that any one of the various specific embodiments herein described and illustrated may be further modified to incorporate features shown in other of the specific embodiments. In addition, it is contemplated that annular grooves in the light transmissive plug alone, without corresponding crimps in the light source cap and endoscope adapter, can provide a satisfactory seal. Thus, it has been found that such grooves in the transmissive plug can establish a sufficient labrynth seal with the inner sheath to prevent leakage.

The invention in its broader aspects therefore is not limited to the specific embodiments herein shown and described but departures may be made therefrom within the scope of the accompanying claims without departing from the principles of the invention and without sacrificing its chief advantages.

What is claimed is:

1. A liquid light guide comprising:
   a flexible elongated tube having opposed first and second open end portions;
   a light transmissive medium disposed in said elongated tube;
   first and second light transmissive members positioned at least partially within the first and second end portions to close the elongated tube, at least one of the first and second light transmissive members including an annular groove formed therein, the annular groove dimensioned to enhance the sealing engagement between the at least one light transmissive member and the respective end portion of the elongated tube; and
   first and second end adapters positioned at least partially around respective first and second end portions of the elongated tube, at least one of the end adapters including a circumferential groove formed therein in alignment with the annular groove in the at least one light transmissive member such that portions of the at least one adapter displaced by the circumferential groove interfit with the annular groove of the at least one light transmissive member to compress the respective tube end portion therebetween and form a substantially fluid tight seal while facilitating retention of the at least one adapter about the respective tube end portion.

2. The liquid light guide of claim 1 including a plurality of annular grooves formed in the at least one light transmissive member.

3. The liquid light guide of claim 1 further including first and second end adapters positioned at least partially around respective first and second end portions of the elongated tube, at least one of the end adapters including a circumferential groove formed therein in alignment with the annular groove in the at least one light transmissive member such that portions of the at least one adapter displaced by the circumferential groove interfit with the annular groove of the at least one light transmissive member to compress the respective tube end portion therebetween and form a substantially fluid tight seal.

4. The liquid light guide of claim 1, wherein the at least one light transmissive member includes a plurality of annular grooves formed therein and wherein the at least one end adapter includes a plurality of circumferential grooves formed therein in alignment with corresponding annular grooves of the at least one transmissive member such that portions of the at least one adapter displaced by the circumferential grooves interfit with the corresponding annular grooves of the at least one transmissive member to compress the respective tube end portion therebetween and thereby form a substantially fluid tight seal.

5. A method for forming a liquid light guide of the type including a flexible tube member having opposed tube end portions and being filled with a light transmissive fluid, the flexible tube member being fabricated from a material having an index of refraction less than the index of refraction of the light transmissive fluid, the method including the steps of:

positioning a transparent light transmissive plug at least partially within at least one of the tube end portions, the transmissive plug including a plurality of circumferential grooves formed in its outer surface, the circumferential grooves dimensioned to enhance the sealing engagement between the transmissive plug and the at least one tube end portion.

6. The method of claim 5 further including the step of positioning a light transmissive plug at least partially within the other tube end portion, wherein the transmissive plug includes a plurality of circumferential grooves formed in its outer surface.

7. The method of claim 5 further including the steps of:

positioning a connector member at least partially about the transmissive plug; and pressing a plurality of circumferential grooves about the peripheral surface of the connector member adjacent the circumferential grooves of the transmissive plug such that portions of the connector member displaced by the pressing interfit with the circumferential grooves of the transmissive plug to compress the at least one tube end portion therebetween to form a substantially fluid tight seal while facilitating retention of the connector member about the one tube end portion and the transmission plug.

8. The method of claim 5 wherein the step of pressing includes pressing the connector member portion with a wheel press.

9. The liquid light guide of claim 1, wherein the first and second light transmissive members each include an annular groove formed therein and wherein the first and second end adapters each include a circumferential groove formed therein in alignment with the annular groove in the respective light transmissive member such that portions of the first and second adapters displaced by the circumferential grooves interfit with the annular groove of the respective light transmissive member to compress the respective tube end portions therebetween and form a substantially fluid tight seal while facilitating retention of the first and second adapters about the respective tube end portion.

10. The liquid light guide of claim 9, wherein the first and second light transmissive members each include a plurality of annular grooves formed therein and wherein the first and second adapters each include a plurality of circumferential grooves formed therein in alignment with corresponding annular grooves of the transmissive members such that portions of each adapter displaced by the circumferential grooves interfit with the corresponding annular grooves of the respective transmissive member to compress the respective tube end portion therebetween and thereby form a substantially fluid tight seal.

11. The liquid light guide of claim 1 wherein the annular groove of the light transmissive member has an arcuate cross-section and wherein the circumferential groove of the one end adapter has a corresponding arcuate cross-section.

12. The liquid light guide of claim 1 wherein the annular groove of the light transmissive member has a trapezoid cross-section and wherein the circumferential groove of the one end adapter has a corresponding trapezoid cross-section.

* * * * *